United States Patent
Leiter (10) Patent No.: US 12,442,467 B2
(45) Date of Patent: Oct. 14, 2025

(54) DOUBLE SEAT VALVE

(71) Applicant: GEA Tuchenhagen GmbH, Büchen (DE)

(72) Inventor: Frank Leiter, Schwarzenbek (DE)

(73) Assignee: GEA Tuchenhagen GmbH, Büchen (DE)

( * ) Notice: Subject to any disclaimer, the term of this patent is extended or adjusted under 35 U.S.C. 154(b) by 16 days.

(21) Appl. No.: 18/569,140

(22) PCT Filed: Jun. 9, 2022

(86) PCT No.: PCT/EP2022/065663
§ 371 (c)(1),
(2) Date: Dec. 11, 2023

(87) PCT Pub. No.: WO2022/258742
PCT Pub. Date: Dec. 15, 2022

(65) Prior Publication Data
US 2024/0337329 A1  Oct. 10, 2024

(30) Foreign Application Priority Data
Jun. 11, 2021 (DE) .................... 10 2021 003 018.4

(51) Int. Cl.
*F16K 37/00* (2006.01)
*F16K 1/44* (2006.01)
*F16K 31/122* (2006.01)

(52) U.S. Cl.
CPC .......... *F16K 37/0041* (2013.01); *F16K 1/443* (2013.01); *F16K 31/1225* (2013.01); *F16K 2200/204* (2021.08)

(58) Field of Classification Search
CPC ................. F16K 37/0041; F16K 1/443; F16K 2200/204; F16K 31/1225
See application file for complete search history.

(56) References Cited

U.S. PATENT DOCUMENTS 4,436,106 A * 3/1984 Tuchenhagen .......... F16K 1/446
137/240
4,471,304 A * 9/1984 Wolf .................... F15B 15/2861
324/251

(Continued)

FOREIGN PATENT DOCUMENTS

DE 4035017 C1 1/1992
DE 4220967 A1 1/1994

(Continued)

*Primary Examiner* — Angelisa L. Hicks
(74) *Attorney, Agent, or Firm* — Young Basile Hanlon & MacFarlane, P.C.

(57) ABSTRACT

A double seat valve including a first closure element that can be brought into sealing contact with a first valve seat, a second closure element that can be brought into sealing contact with a second valve seat, a sensor object coupled to the first closure element, and a sensor apparatus that interacts with the sensor object is disclosed. The sensor apparatus comprises a sensor and an electronic evaluation unit. A manipulator designed to interact with the sensor object interacts with the second closure element. The sensor apparatus is designed for verification of the interaction of the manipulator with the sensor object.

20 Claims, 5 Drawing Sheets

(56) References Cited

U.S. PATENT DOCUMENTS

| | | | | |
|---|---|---|---|---|
| 4,715,795 A | * | 12/1987 | Habrich | F04B 13/00 |
| | | | | 137/637.2 |
| 5,469,880 A | * | 11/1995 | Zimmerly | F16K 1/446 |
| | | | | 137/240 |
| 6,356,072 B1 | * | 3/2002 | Chass | G01D 5/142 |
| | | | | 324/207.2 |
| 7,969,146 B2 | * | 6/2011 | Christianson | F16K 37/0033 |
| | | | | 324/207.2 |
| 2004/0211928 A1 | | 10/2004 | Coura et al. | |
| 2013/0037146 A1 | * | 2/2013 | Anagnos | F16K 39/024 |
| | | | | 137/614.16 |
| 2014/0311600 A1 | | 10/2014 | Burmester | |
| 2019/0137000 A1 | | 5/2019 | Grosse | |

FOREIGN PATENT DOCUMENTS

| | | |
|---|---|---|
| DE | 10 2013 018564 A1 | 5/2015 |
| DE | 10 2006 039493 B4 | 6/2016 |
| EP | 3141971 A1 | 3/2017 |
| WO | 2012/130904 A1 | 10/2012 |

\* cited by examiner

DOUBLE SEAT VALVE

TECHNICAL FIELD

The invention relates to a double seat valve including a first closure element that can be brought into sealing contact with a first valve seat, a second closure element that can be brought into sealing contact with a second valve seat, a sensor object coupled to the first closure element, and a sensor apparatus that interacts with the sensor object.

BACKGROUND

Double seat valves are used in systems for the production of food products, beverages, medicines and fine chemical products, as well as in biotechnology. In such processing systems, a high degree of automation is desired, in which the valves are also detected and included.

Double seat valves have two closure elements with a changeable position for influencing the fluid flow through the valve. Automation includes being able to determine the position of the closure elements. The position is typically determined using a valve control device, which is part of the double seat valve.

The position measurement was already introduced many years ago. For example, DE 4035017 C1 proposes providing mechanical switches in the valve control device, the switching position of which is changed by the movement of the closure elements. At least one switch is assigned to each closure element.

In the course of technical development, the mechanical switches were replaced by contactless systems. For example, Hall sensors, light barriers, and capacitive proximity sensors are proposed in DE 102006039493 B4.

A contactless measurement in a valve with only one closure element is presented in DE 102013018564 A1. In this case, a transmission and receiving antenna arrangement is provided in the valve control device and interacts with a sensor object, comprising an oscillating circuit, on the closure element. The oscillating circuit is excited by the transmitted signal to emit a resonant wave. The creation location of the resonant wave, which represents the position of the one closure element, is ascertained by the receiving antenna arrangement.

SUMMARY

It is therefore an object of this disclosure to create a simple arrangement for contactless measurement of the position of at least two closure elements of a valve, in particular a double seat valve.

This object is solved by a double seat valve equipped with a first closure element that can be brought into sealing contact with a first valve seat, a second closure element that can be brought into sealing contact with a second valve seat, a sensor object coupled to the first closure element, and a sensor apparatus that interacts with the sensor object and comprises a sensor and an electronic evaluation unit. The position of the second closure element is measured in that a manipulator designed to interact with the sensor object interacts with the second closure element. The sensor apparatus is designed for the verification of the interaction of the manipulator with the sensor object.

The manipulator is designed to interact with the sensor object depending on a position of the first closure element and/or of the second closure element. For example, the first closure element can be connected to a valve rod. The sensor object can also be coupled to the valve rod. To move the first closure element between its switching positions and thus to move the sensor object, the valve rod can be moved in the axial direction. For example, the second closure element can be connected to a hollow rod, wherein the valve rod passes through the second closure element and the hollow rod. The manipulator can interact with the hollow rod, for example, be coupled to it. A connection or, respectively, coupling of the sensor object to the valve rod and a connection or, respectively, coupling of the manipulator to the hollow rod can each take place directly or indirectly via connection or, respectively, coupling elements. To move the second closure element between its switching positions, the hollow rod can be moved in the axial direction. An (axial) movement of the closure elements causes a movement of the sensor object and of the manipulator. This is detected through measurements by the sensor apparatus. The respective positions of the closure elements are inferred from this. The first closure element can be a first valve disk. Correspondingly, the second closure element can be a second valve disk. The axial movement direction of the first or, respectively, second closure element forms a stroke axis of the valve.

The proposed solution is based on the realization that, in order to determine the position of the second closure element, no sensor object connected to it and, accordingly, also no additional sensor is necessary. Rather, it is sufficient to change properties of the first sensor object with a manipulator and to verify this change via the sensor apparatus.

In this case, the manipulator can cover (e.g., overlap) the sensor object in an axial direction depending on the position of the first closure element and/or of the second closure element, and the sensor apparatus can ascertain the degree of coverage. For example, it is conceivable that the sensor object extends along the switching path of the first closure element and the manipulator, depending on the position of the second closure element, covers the sensor object at least in parts or in portions. The covering (e.g., axial overlapping) can take place on the outside and/or on the inside of the sensor object. It is also possible that the manipulator does not cover the sensor object at all at times when adjusting the first and/or second closure element, and/or that the manipulator completely covers the sensor object at times when adjusting the first and/or second closure element. The degree of the respective coverage of the sensor object is detected through measurements by the sensor apparatus. The position of the first and/or second closure element can be inferred from this. In particular, the extension length of the sensor object is ascertained by the appropriately designed sensor apparatus, and a change is observed. This allows the conclusion to be drawn about the switching position in particular of the second closure element.

According to a particularly practicable configuration, the sensor apparatus can verify the interaction of the manipulator with the sensor object by a magnetic measurement method. It is conceivable to design the sensor object magnetically and then to shield it. Initially, the sensor apparatus can detect the presence and the (axial) position of the sensor object by magnetic interaction. The position of the first closure element can be inferred from this. For example, the covering of the sensor object by the manipulator can change the magnetic properties of the sensor object. This magnetic change can in turn be detected by the sensor apparatus. The position of the manipulator in relation to the sensor object and thus the position of the second closure element can be inferred from this.

Other measurement methods could also be conceivable. For example, the sensor apparatus could verify the interaction of the manipulator with the sensor object by an optical measurement method, meaning to design the sensor apparatus based on an optical operating principle. The sensor object then has optical properties, and is designed, for example, as a reflective surface portion that is covered in parts by a manipulator when the position of the closure elements changes. Such a decrease in length can then be verified optically by means of the sensor apparatus.

Using a manipulator makes it unnecessary to install a second sensor object and to create verification possibilities for it. The changes to the sensor apparatus are more cost-effective than creating an additional sensor object, an additional sensor, and an associated electronic evaluation unit. In addition, many identical parts can be used in a series of single seat and double seat valves, whereby scale effects can be taken advantage of during production. Due to the few necessary components, the system is robust and reliable in its application. The measurement of the position of both closure elements takes place at one point so that external cabling between a sensor and the electronic evaluation unit is omitted, provided that the sensor is attached, for example, between a valve housing, in which the closure elements are arranged, and an adjustment device, which effects the movement of the closure elements.

The mentioned advantages are particularly pronounced when using the measurement principle from DE 102013018564 A1. The sensor object here comprises an oscillating electric circuit. The manipulator is then preferably designed to influence the magnetic flux density and to be inserted into the coil of the oscillating circuit, for example, in the form of an iron rod. The degree of insertion is dependent on the position of the first and second closure element. The influence of the magnetic flux changes the properties of the oscillating electric circuit, for example, the frequency. The sensor apparatus can comprise a transmitting arrangement with at least one transmitting coil and a receiving arrangement with at least one receiving coil. Preferably, the receiving arrangement can have a first and a second receiving coil. The change of the frequency emitted by the coil of the oscillating circuit leads to a changed frequency in the receiving arrangement or, respectively, receiving antenna of the sensor apparatus. The electronic evaluation unit is designed to detect this frequency shift and to generate a signal based thereon. For example, the windings of the two receiving coils can be placed so that waves emitted by the sensor object, in particular the oscillating circuit, induce phase-shifted voltages in the receiving coils. Measuring the voltages induced in the receiving coils allows the position of the sensor object relative to the measurement path and the receiving arrangement to be determined. Thus, two parameters are available to determine the positions of the two closure elements, namely the position of the resonator relative to the antenna arrangement and the frequency of the wave emitted by the resonator. This solution is possible in a manner that is cost-effective, simple in design, robust, and reliable. In a series that comprises single seat and double seat valves, the only additional component in double seat valves is the manipulator in the double seat valve.

The sensor apparatus with the sensor and the electronic evaluation unit can be arranged completely in a flange-mounted control head, into which a portion of the first closure element or an element connected to this closure element protrudes and carries the sensor object. In this manner, a modular system of valves with position measurement and without position measurement can be created cost-effectively. In addition, retrofitting is simplified.

An adjustment apparatus, for example, based on a pneumatic operating principle, can be provided in order to be able to bring each of the closure elements into contact with the respectively assigned valve seat and to release this contact again. The adjustment apparatus can be designed, in addition to an open position of the valve in which both closure elements are lifted from the respective valve seat and the closed position of the valve in which both closure elements are in sealing contact with the respective valve seat, to also effect cleaning positions in which one of the two closure elements is lifted from the valve seat in each case in order to be able to clean it.

According to another configuration, the manipulator can be designed in the shape of a rod. For example, the manipulator can be an iron rod. The longitudinal axis of the rod is preferably aligned along the axial movement direction of the closure element or, respectively, of a valve rod and hollow rod. The manipulator can also have portions with different magnetic properties. This configuration allows a more flexible detection of the position of the manipulator and thus of the second closure element.

The manipulator can be coupled to the second closure element, in particular rigidly coupled. As a result, the movement of the second closure element is directly converted into a movement of the manipulator.

According to another configuration, the manipulator can be connected at an end facing the second closure element to a pin that is connected to the hollow rod, wherein the pin is guided in elongated holes of the valve rod or of a carrier coupled on one side to the valve rod and on the other side to the sensor object. In particular, the pin can be aligned transversely to the axial direction of the hollow rod, meaning the pin can form a transverse pin. When the second closure element moves between its switching positions, the pin is guided in elongated holes of the valve rod or of a carrier coupled on one side to the valve rod and on the other side to the sensor object.

According to another configuration, a distance that changes when the second closure element moves can exist between the manipulator and the second closure element. This configuration has multiple advantages. On the one hand, the axial movement of the second closure element or, respectively, of a hollow rod connected to the second closure element is not transferred one to one into an axial movement of the driver, because the distance must initially be overcome. This can offer advantages in terms of measurement, in particular in the case of smaller movements of the second closure element that are irrelevant and would generate a measurement result in the case of a rigid coupling. On the other hand, in this manner, a rotary decoupling between the second closure element and the manipulator can be achieved, which is desired depending on the use case. A rotation of the second closure element and optionally of a hollow rod about the stroke axis thus does not lead to a mechanical loading of the manipulator or, respectively, additional components connected to the manipulator, such as the pin and optionally present connection or coupling elements, for example drivers or the like.

According to another configuration, the hollow rod can press the pin and, with the pin, the manipulator in the axial direction of the hollow rod when the second closure element moves. This pressing of the manipulator, for example, into a coil of the sensor object, can change, for example, the magnetic properties of the sensor object. A movement of the manipulator is possible in this case in principle in both directions along the stroke axis of the valve, meaning, for example, into a coil of the sensor object or out of it. In the first case, the manipulator can be located, for example, outside of the coil in the resting state and can be pressed into the coil by the hollow rod or, respectively, the pin to different extents. However, it is also conceivable that the manipulator is located in the coil in the resting state and is pressed out of the coil by the hollow rod or, respectively, the pin to different extents.

The manipulator can be pretensioned into a resting position by a pretensioning element, preferably a pretensioning spring. For example, the manipulator can be pretensioned in a direction facing the second closure element. A pretensioning element, for example, a pretensioning spring, serves as a return element that moves the manipulator back into a starting position if there is a lack of pressing contact of the hollow rod. The hollow rod thus presses the manipulator in the axial direction or, respectively, along the stroke axis against the pretensioning. A compression spring or a tension spring can be used as the pretensioning spring. As an alternative to a pretensioning spring, an air cushion, for example, can be provided as the return element.

According to another configuration, the manipulator can be movably mounted on the sensor object, preferably via a carrier that is movably mounted on the sensor object. In this configuration, the manipulator, which serves, for example, as a detuning element, and the sensor object, which serves, for example, as a resonator target, form an assembly. The manipulator is movably arranged on the sensor object, but both elements are movable, in particular shiftable, relative to each other. The movement or, respectively, shifting in a direction during a movement of the second closure element can take place by means of a driver acting as a tappet. In the opposite direction, in turn, a pretensioning element or, respectively, return element providing pretensioning, for example, a pretensioning spring, can be provided. By providing a carrier, a tappet, for example, can press against the carrier instead of having direct contact with the manipulator.

The sensor object can furthermore have a lid portion, on which the pretensioning element rests. The lid portion can have at least one passage. A carrier can also have at least one passage. By means of such passages, air conveyance for pressure equalization can be ensured. It is also conceivable, for example, to design a tappet as a tube.

According to another configuration, the hollow rod can press the manipulator in the axial direction of the hollow rod, preferably via a tappet connected to the hollow rod, when the second closure element moves. For the movement of the manipulator, what has been said above applies. In particular, both movement directions along the stroke axis of the valve are possible, meaning, for example, into a coil of the sensor object or out of it.

The distance between the manipulator and the second closure element, which changes during a movement of the second closure element, can be filled with a compressible material, which is preferably fastened only to the manipulator. The variable distance and the associated advantages explained above can be retained with this configuration. At the same time, a damping of the contact between the involved components of the second closure element or, respectively, of the hollow rod on the one hand and the manipulator on the other hand can be ensured in a preferred manner. The compressible material can also be used as a return element to move the manipulator into its resting position.

The details of the invention will be explained in greater detail and their advantages will be explored in more depth based on exemplary embodiments.

BRIEF DESCRIPTION OF THE DRAWINGS

FIGS. 3A-3E show schematic representations of various positions of the closure elements.

The same reference signs refer to the same or functionally similar components in the figures.

DETAILED DESCRIPTION

Figure 1:
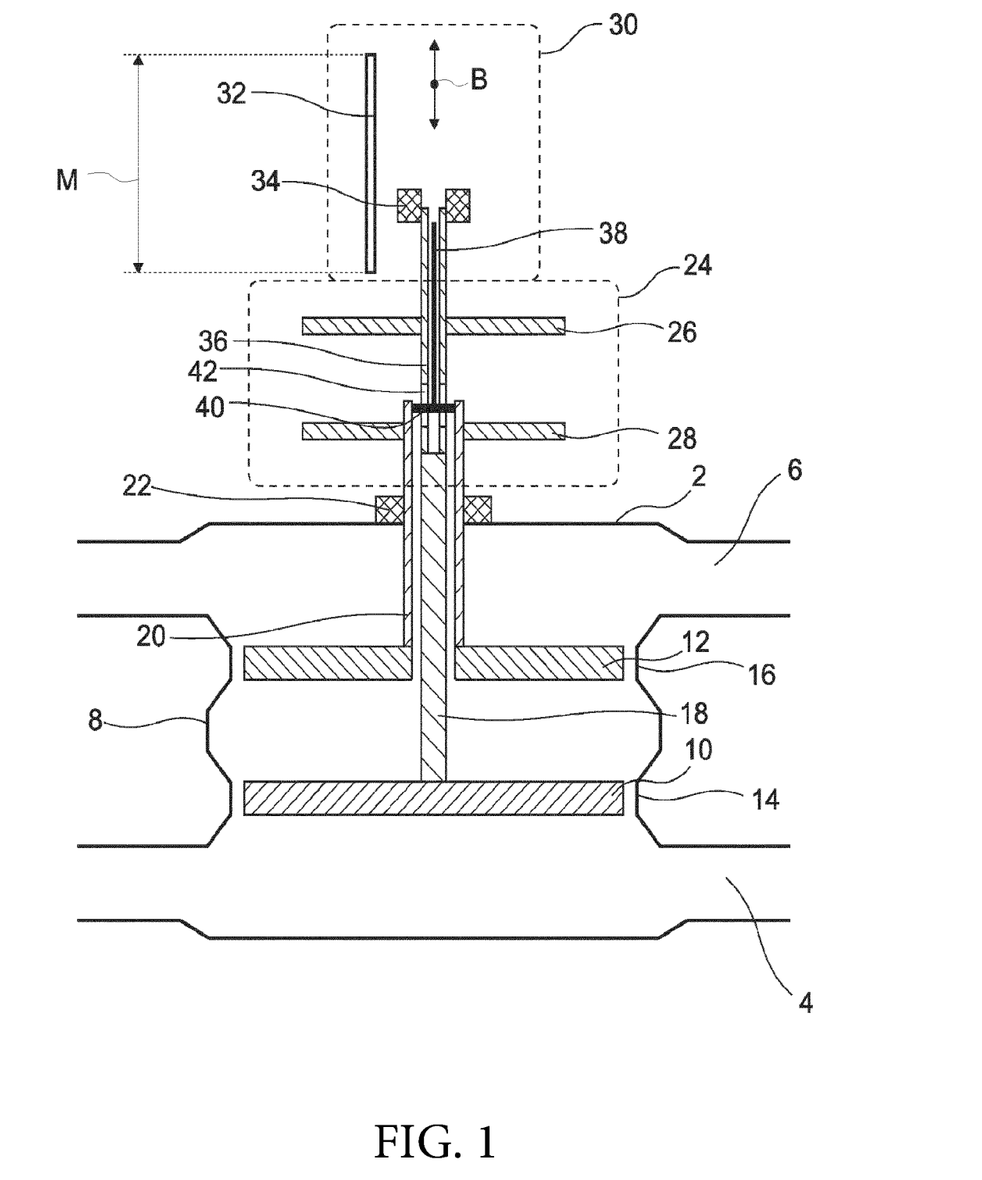
FIG. 1 shows a schematic representation of a double seat valve.

FIG. 1 schematically shows a double seat valve.

The double seat valve comprises a housing 2 and has a first port 4 and a second port 6. The first port 4 and the second port 6 are fluidically connected by means of a passage 8. The fluid connection can be switched. For this purpose, a first closure element 10 and a second closure element 12 are provided. The first closure element 10 can be brought into sealing contact with a first valve seat 14 and the second closure element 12 can be brought into sealing contact with a second valve seat 16. The valve seats 14 and 16 and/or closure elements 10 and 12 can have suitable sealing means for this purpose, for example, sealing rings. The sealing arrangements can be designed radially, semi-axially, or axially.

The sealing position of the closure elements 10 and 12 can be achieved by independent or coupled movement of the closure elements 10 and 12 along a movement direction B. To be able to cause the movement, the first closure element 10 is connected to a valve rod 18. This passes through the second closure element 12 and a hollow rod 20, which is attached to the second closure element 12. The hollow rod 20 is movably guided out of the housing 2 of the valve. For this purpose, a housing duct 22 is provided, which allows the guidance of the hollow rod 20 and sealing.

In the example shown, the movement of the valve rod 18 and the hollow rod 20 is generated by a schematically shown adjustment apparatus 24, which is preferably operated with a pressure medium, in particular pneumatically. For this purpose, the adjustment apparatus 24 comprises a first piston 26 and a second piston 28. The first piston 26 causes the movement of the valve rod 18, while the second piston 28 is connected to the hollow rod 20 and thereby causes a movement of the second closure element 12.

A control head 30 is releasably fastened, for example by means of a flange connection, to the adjustment apparatus 24 on a side of the adjustment apparatus 24 facing away from the housing 2.

An antenna arrangement 32 is located in the control head 30 and extends along the movement direction B and, as a result of this extension, generates a measurement path M. A sensor object 34 is movably arranged along the measurement path M and is coupled to the first closure element 10. As a result of the coupling, the movement of the first closure element 10 is transferred directly into a representative movement of the sensor object 34 along the measurement path M. The coupling is preferably designed rigidly with a carrier 36, which is designed, for example, as a hollow rod that is connected to the valve rod 18. The carrier 36 can be designed to carry the first piston 26 or be connected to a rod portion that carries the first piston 26 of the adjustment apparatus 24.

The sensor object 34 is designed to interact with the antenna arrangement 32. Preferably, it is designed to receive an electromagnetic signal and emit an electromagnetic signal in response.

A manipulator 38 projects into the control head 30 up to the height of the measurement path M. The manipulator 38 is accommodated in an interior of the carrier 36 and is connected to a pin 40 that passes through elongated holes 42 that are formed in the carrier 36. The pin 40 is, in turn, connected to the hollow rod 20. In this manner, a movement of the hollow rod 20 along the movement direction B effected by the second piston 28 is converted into both a movement of the second closure element 12 and also a movement of the manipulator 38. The manipulator 38 is dimensioned such that it is inserted into the sensor object 34 (e.g., the manipulator 38 may overlap the sensor object 34 in the axial direction) at least in portions and changes its effect depending on the position of the closure elements 10 and 12. The dependency on the position of the closure elements 10 and 12 is explained in more detail based on FIGS. 3A-3E.

Figure 2:
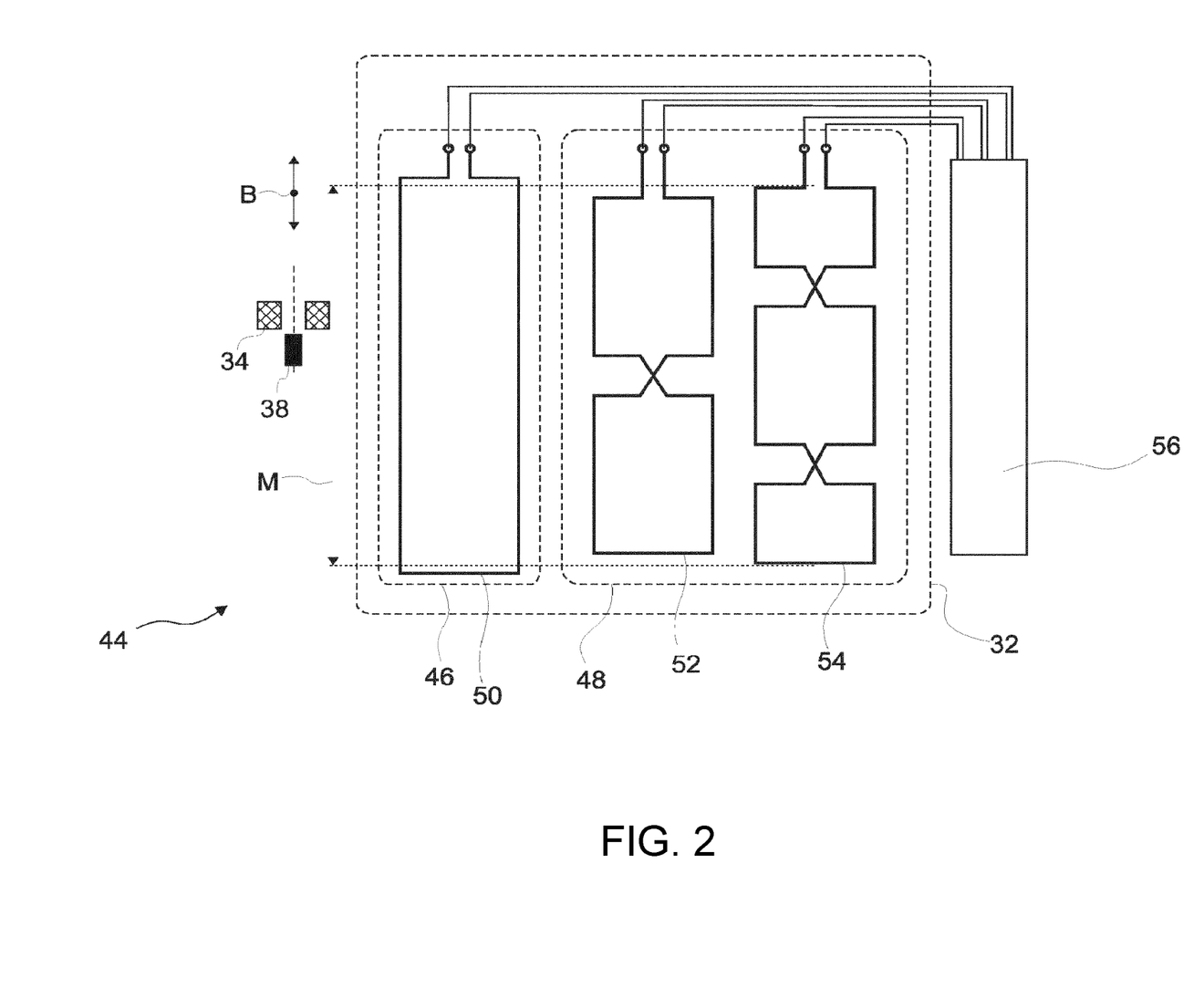
FIG. 2 shows a schematic representation of a sensor apparatus with an antenna arrangement and electronic evaluation unit.

A schematic representation of the antenna arrangement 32, which is part of a sensor apparatus 44, is shown in FIG. 2. The antenna arrangement 32 comprises a transmitting arrangement 46 and a receiving arrangement 48. Both the transmitting arrangement 46 and the receiving arrangement 48 extend over the measurement path M.

The transmitting arrangement 46 can comprise a transmitting coil 50, which has one or a plurality of windings and is aligned so that the entire measurement path M can be covered by an emitted signal.

The receiving arrangement 48 can have a first receiving coil 52 and a second receiving coil 54. The windings of the receiving coils 52 and 54 are placed so that waves emitted by the sensor object 34 induce phase-shifted voltages in the receiving coils 52 and 54. Measuring the voltages induced in the receiving coils 52 and 54 allows the position of the sensor object 34 relative to the measurement path M and the receiving arrangement 48 to be determined.

An electronic evaluation unit 56 is connected to the transmitting arrangement 46 and the receiving arrangement 48. The electronic evaluation unit 56 is designed to supply current to the transmitting coil 50 so that the transmitting coil 50 generates an electromagnetic wave. Furthermore, the electronic evaluation unit 56 is designed to determine the voltages induced in the receiving coils 52 and 54 by the sensor object 34 and, from this, derive the position of the sensor object 34 relative to the measurement path M.

The sensor object 34 comprises a resonator coil, which forms an oscillating electric circuit together with a capacitor provided on the sensor object 34. These components can be cast in a potting compound and thereby stabilized mechanically and protected from environmental influences. An electromagnetic wave emitted by the transmitting arrangement 46 excites the oscillating electric circuit, whereby a resonant wave is created. The resonator coil is shaped like a ring and designed to accommodate the manipulator 38 at least in portions and is aligned rotationally symmetrically to the movement direction B. The windings, also known as conductor loops, of the coil are therefore wound about the movement direction B. The effect of the manipulator 38 on the resonator coil is particularly pronounced when the manipulator 38 is inserted at least partially into the ring of the resonator coil depending on the position of the closure elements 10 and 12.

The structure of the sensor object 34 and the antenna arrangement 32 can be designed according to DE 102013018564 A1.

FIGS. 3A-3E schematically show the various positions of the first closure member 10 and second closure member 12 and the positions of the sensor object 34 and the manipulator 38 determined by them due to the coupling. This representation illustrates the operating principle of the subject matter herein described.

Two parameters can be detected with the described arrangement. One parameter is the position of the sensor object 34 as the starting point of a resonant wave along the measurement path M. A second parameter is the frequency shift of the resonant wave created by the insertion of the manipulator into the resonant coil. Therefore, position measurement and frequency shift are available as two measurement variables, which depend on the two positions of the closure elements 10 and 12 and therefore allow these positions to be inferred.

For the example, the dimensioning described in the following was chosen, on the basis of which a person skilled in the art can make modifications.

Figure 3A:
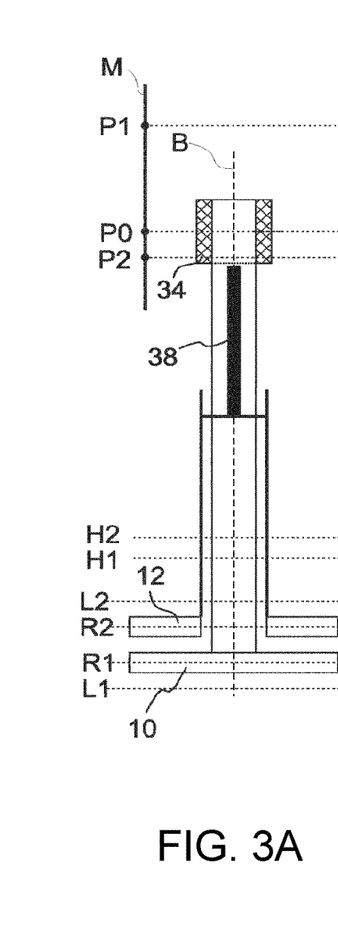
FIG. 3A shows a closed position of the valve.

FIG. 3A shows the resting position of the valve. In this example, this is the closed position of the double seat valve. In this position, the closure elements 10 and 12 are each in sealing contact with the respectively assigned valve seats 14 and 16. The first closure element 10 is in the resting position R1, the second closure element 12 is in the resting position R2, and the sensor object 34 is on the measurement path M at the position P0. The manipulator 38 is not yet inserted into the sensor object 34 and its resonator coil. The receiving arrangement 48 receives a resonant wave with a first frequency.

Figure 3B:
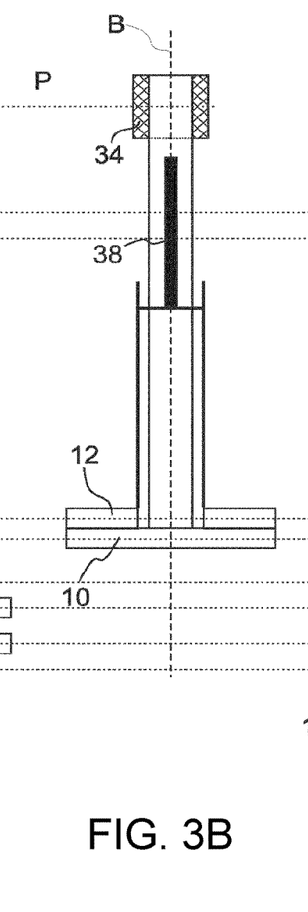
FIG. 3B shows an open position of the valve.

In FIG. 3B, the closure elements 10 and 12 are in an open position of the valve. For this purpose, the closure elements 10 and 12 are lifted from the assigned valve seats 14 and 16 and brought into a position H1 and H2, as a result of which a fluid flow through the passage 8 is enabled. The sensor object 34 is located at a position P1 along the measurement path M. The manipulator 38 is at a distance from the sensor object 34.

Figure 3C:
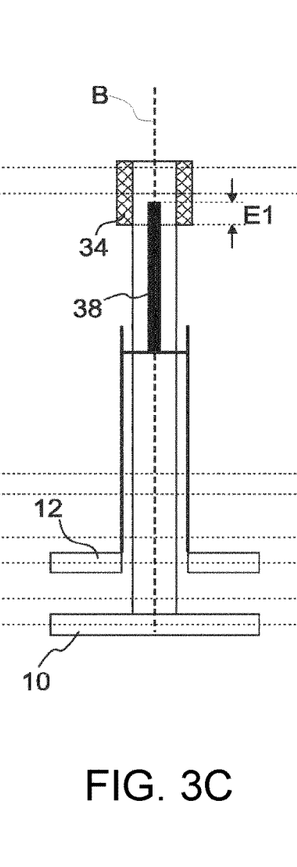
FIG. 3C shows a cleaning position of the first closure element.

A cleaning position of the first closure element 10 is shown in FIG. 3C. The first closure element 10 is adjusted to a position L1, in which a cleaning gap exists between the first closure element 10 and the first valve seat 14. The second closure element 12 is still in position R2 and in sealing contact with the second valve seat 16. The movement of the first closure element 10 from the position R1 to L1 is such that the distance between the first closure element 10 and the second closure element 12 increases. This leads to the sensor object assuming a position P2 on the measurement path M, which position lies on a side of position P0 lying opposite the position P1. The manipulator 38 is inserted into the sensor object 34 and its coil with the insertion depth E1 (i.e., a degree of overlap), as a result of which a first frequency change results. The oscillating electric circuit, for example including a coil, oscillates with a second frequency, which is different from the first frequency.

Figure 3D:
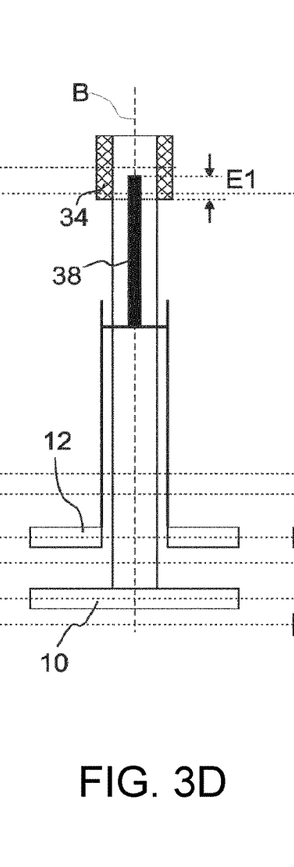
FIG. 3D shows a cleaning position of the second closure element.

A cleaning position of the second closure element 12 is shown in FIG. 3D. The second closure element 12 is brought out of the resting position R2 and into the position L2. A cleaning gap is formed between the second closure element 12 and the second valve seat 16. The first closure element 10 remains in the position R1 and in sealing contact with the first valve seat 14. The sensor object 34 is therefore located at position P0, and the manipulator is inserted into the sensor object 34 by the insertion depth E1, which leads once again to a frequency change of the resonant wave. In the example shown, the insertion depths of the manipulator in the two positions according to FIG. 3C and FIG. 3D are the same. This is advantageous in order to achieve the same cleaning effect but is not mandatory.

Figure 3E:
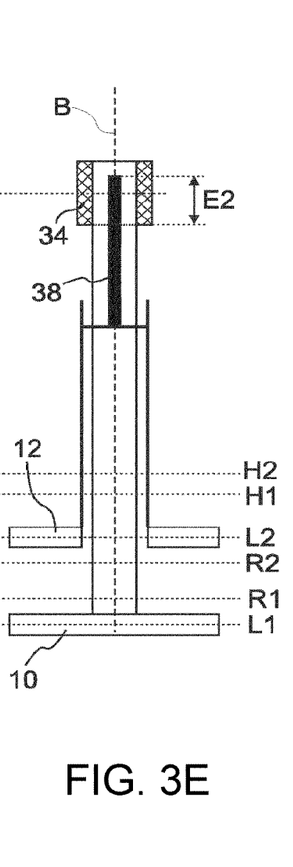
FIG. 3E shows a simultaneous cleaning position of both closure elements.

Finally, in FIG. 3E, a valve position is shown in which both closure elements 10 and 12 are located in their respective cleaning positions. For the valve in this example, this position can represent a malfunction, which can advantageously be verified. This position can, however, also be used to clean the valve depending on the state of the processing system. The process controller must then prevent product from being brought to the valve. Here, both closure elements 10 and 12 are lifted from the assigned valve seats 14 and 16 and each form a cleaning gap. Because the closure elements 10 and 12 execute a movement in opposite directions to the positions L1 and L2 and have the greatest distance from each other, the manipulator is inserted into the sensor object 34 by a greater value E2 of the insertion depth. This results in the greatest frequency shift of the shown positions of the closure elements 10 and 12; the resonant wave has a third frequency.

The evaluation of the positions of the closure elements 10 and 12 is simple. The positions according to FIG. 3A and FIG. 3B differ in the position of the sensor object 34 and can be clearly established (i.e., the sensor apparatus 44 ascertains the positions). Compared to the positions according to FIG. 3A and FIG. 3B, the positions according to FIG. 3C and FIG. 3D have a verifiable frequency shift and differ from each other by the positions P0 and P2 of the sensor object 34. The position according to FIG. 3E has the same position P2 of the sensor object 34 as the position according to FIG. 3C but differs from it in turn by the stronger frequency shift due to the insertion depth E2, which is greater than the insertion depth E1.

The manipulator 38 is designed according to this functional description in particular to cause a frequency shift that can be verified through measurement with the antenna arrangement 32 and electronic evaluation unit 56. This affects, for example, the selection of the material, which may be based on known coil cores made of ferromagnetic substances. The material properties can change over an expanse of the manipulator along the movement direction B, for example, the ferromagnetism or magnetic flux density can be a different strength. With this, the frequency differences generated by the two different insertion depths E1 and E2 can be amplified.

The coupling of the sensor object 34 to the first closure element 10 and the coupling of the manipulator 38 to the second closure element 12 can be of multi-part design in order to facilitate the mountability of the arrangement. The coupling must be mechanically stable and must not be released by the movement of the closure elements 10 and 12.

As shown, this structure is suitable for determining the position of both closure elements 10 and 12 with a single measuring arrangement, the receiving arrangement 48, and a sensor object 34. Complex measuring arrangements with multiple sensors can be dispensed with, and an additional sensor object is also unnecessary.

In the example presented here, the closure elements 10 and 12 of the valve move out of the respective resting position R1 and R2 in opposite directions into the respective cleaning position L1 and L2. It can be advantageous to design the valve in one modification so that this movement runs in the same direction, not in opposite directions. In this case, the position according to FIG. 3C, for example, corresponds to the resting position. FIG. 3A is then the cleaning position of the first closure element 10. FIG. 3E then shows the cleaning position of the second closure element 12.

In the example shown, the main stroke takes place in that the closure elements 10 and 12 move in the direction of the adjustment apparatus 24. In one modification, the main stroke takes place in a direction opposite to this; in FIGS. 3A-3E, the stroke positions H1 and H2 then lie below L1. In order to be able to measure these positions, the measurement path M must be elongated accordingly over P2 in the direction of the closure elements 10 and 12.

According to another development, a modification of the manipulator 38 is proposed. This modification has, on an end facing away from the closure element 12, an elongation with a magnetically neutral material, which is designed to completely pass through the sensor object 34 in the direction of the movement direction B. A second manipulator is attached to this elongation. The elongation and second manipulator are designed in particular so that the second manipulator is located, in the position according to FIG. 3A, on a side outside of the sensor object 34 and facing away from the closure elements 10 and 12, but in the position according to FIG. 3B is inserted into the sensor object 34 or is located completely therein and thus changes the property of the sensor object 34. As a result, the resonant wave received in the receiving arrangement 48 is also changed. The electronic evaluation unit 56 is designed to detect this change and to output a signal. With this described modification, it is possible to detect that the closure elements 10 and 12 are moving away from each other in the open position according to FIG. 3B. During the movement away from each other, the manipulators and the sensor object 34 come into a position relative to each other as in FIG. 3A. The origin of the resonant wave, however, is near P1, which results in a verifiable difference from the target position, in which the second manipulator is within the sensor object 34 near position P1. The verification of the movement away from each other can be desired if a leakage outlet is opened by this movement away from each other that should actually be closed in this position. The error detection of the valve is therefore improved in this modification.

In another modification, the principle of the second manipulator is taken up, but the first manipulator is omitted. A magnetically neutral connection element is then guided from the second closure element 12 to the sensor object 34. A manipulator is then arranged on an end facing away from the second closure element 12 with the effects described above. Preferably, the manipulator is inserted into the sensor object 34 with a first insertion depth in the position according to FIG. 3A. The manipulator extends along the movement direction B so that it is inserted into the sensor object 34 over a longer path in the position according to FIG. 3B than in the position according to FIG. 3A and as a result changes the properties of the resonator to a stronger and verifiable extent. The length of the manipulator can be selected such that the additional positions according to FIG. 3C to FIG. 3E can also be verified.

Further exemplary embodiments of the invention will be explained using FIGS. 4 and 5.

Figure 4:
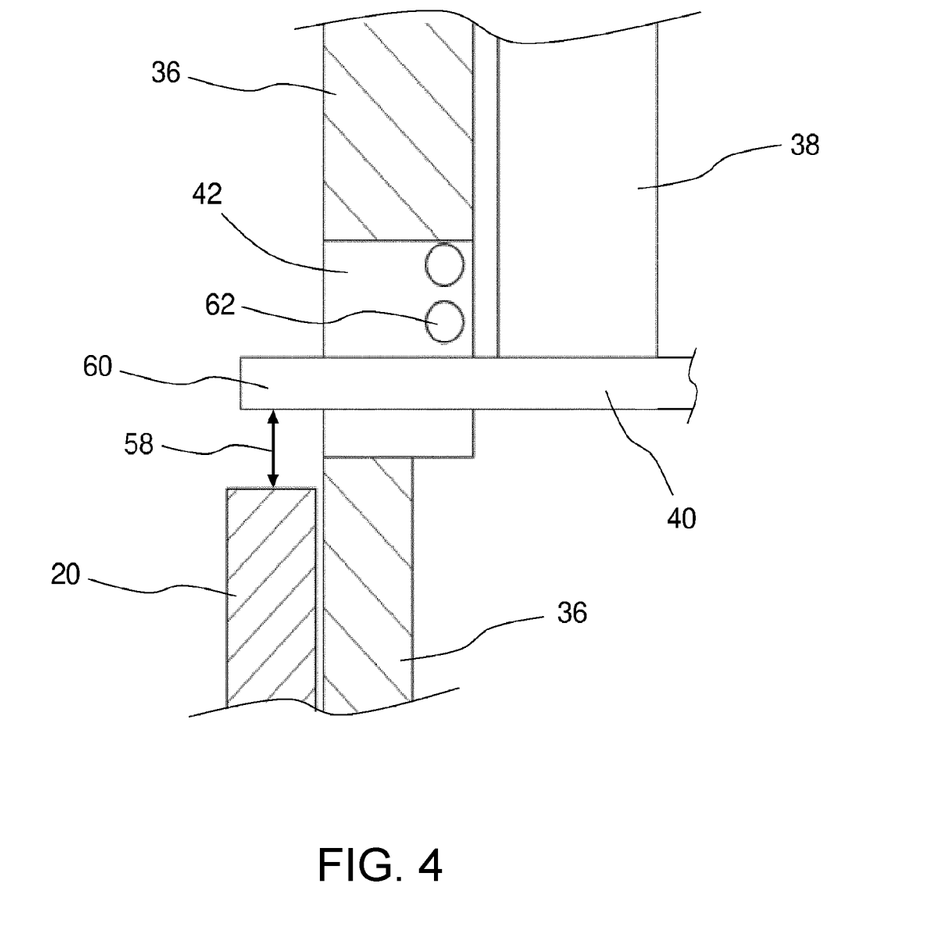
FIG. 4 shows a schematic representation of a part of a double seat valve according to another embodiment.

FIG. 4 shows a section of a double seat valve according to an embodiment of the invention. The double seat valve largely corresponds to the double seat valve according to FIG. 1. It differs from it substantially in that, in the embodiment according to FIG. 4, there exists a distance 58 between the manipulator 38 and the second closure element 12 that changes when the second closure element 12 moves. In the example shown, this distance 58 exists between the hollow rod 20 and an outer end 60 of the pin 40, which is guided in elongated holes 42 of the carrier 36 connected to the valve rod 18. The pin 40 is in turn connected to the manipulator 38. A pretensioning spring 62 rests, on one side, on a wall delimiting the elongated holes 42 and, on the other side, on the pin 40 and pretensions the pin 40 and with it the manipulator 38 in the resting position shown in FIG. 4. When the second closure element 12 is lifted from the valve seat 16, meaning upward in FIG. 4, initially the distance 58 between the hollow rod 20 and the outer end 60 of the pin 40 is closed up to a contact. When the closure element 12 continues to move, the hollow rod 20 presses the pin 40 and with it the manipulator 38 against the pretensioning and upward in FIG. 4 while compressing the pretensioning spring 62, so that the manipulator 38 enters into the coil of the sensor object 34, as was explained above in particular with reference to FIGS. 3A-3E. When the closure element 12 moves back, the pretensioning spring 62 adjusts the pin 40 and thus the manipulator 38 downward in FIG. 4 and back into the resting position. The position shown in FIG. 4 then corresponds to the position shown in FIG. 3A. It is also possible that the pin 40 is connected to the manipulator 38 via a driver instead of a direct connection of the pin 40 to the manipulator 38.

Figure 5:
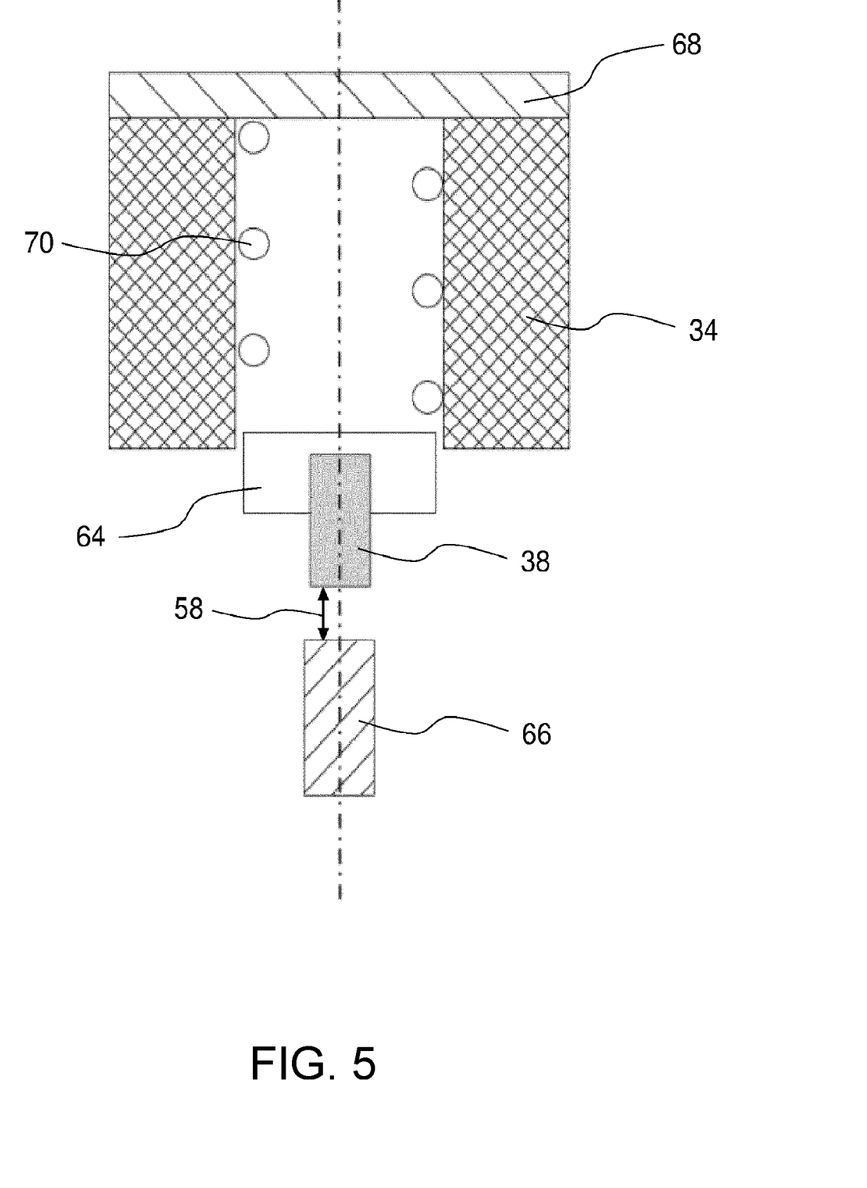
FIG. 5 shows a schematic representation of a part of a double seat valve according to another embodiment.

FIG. 5 shows a section of a further embodiment of a double seat valve according to the invention. This double seat valve also largely corresponds to the double seat valve according to FIG. 1. The embodiment differs from FIG. 1 substantially in that the manipulator 38 and the sensor object 34 form a common assembly, wherein the manipulator 38 is movably mounted to the sensor object 34 via a carrier 64. For this purpose, the manipulator 38 is connected to the carrier 64, which in turn is movably mounted to the sensor object 34. Between a tappet 66, which is connected to the hollow rod 20, and the manipulator 38, there exists, as in the embodiment according to FIG. 4, a distance 58 that changes when the second closure element 12 moves and thus when the hollow rod 20 moves. The distance 58 between the manipulator 38 and the second closure element 12, which changes during a movement of the second closure element 12, may be filled with a compressible material that is fastened only to the manipulator. The sensor object 34 also has a lid portion 68, on which the pretensioning spring 70 rests, which pretensioning spring 70 pretensions the carrier 64 and with it the manipulator 38 in the resting position shown in FIG. 5. When the second closure element 12 is lifted from the valve seat 16, meaning upward in FIG. 5, and the hollow rod 20 is correspondingly moved, initially the distance 58 between the tappet 66 and the manipulator 38 is closed up to a contact. When the closure element 12 and the hollow rod 20 continue to move, the tappet 66 presses the manipulator 38 and with it the carrier 64 against the pretensioning and upward in FIG. 5 while compressing the pretensioning spring 70. In this way, the manipulator 38 enters into the coil of the sensor object 34, as was explained above in particular with reference to FIGS. 3A-3E. When the closure element 12 moves back, the pretensioning spring 70 adjusts the carrier 64 and thus the manipulator 38 downward in FIG. 5 and back into the resting position. The position shown in FIG. 5 then corresponds to the position shown in FIG. 3A.

The tappet 66 can be connected in this case at its lower end (not shown in greater detail in FIG. 5) to the pin 40. However, a configuration would also be conceivable in which the tappet 66 is connected to the manipulator 38 or, respectively, they are designed as a single part. The tappet 66 would then not be connected to the pin 40, but instead would have a changeable distance to the pin 40 and would be moved by the pin 40 only by pressing. The embodiments according to FIGS. 4 and 5 could also be combined such that the lower end of the tappet 66 according to FIG. 5 is connected to the pin 40, which then has a changeable distance to the hollow rod 20 as shown in FIG. 4.

It is understood that in each of FIGS. 4 and 5 only one part of the double seat valve is shown. The further components can in principle be designed as shown in FIGS. 1 and 2 and explained above.

In principle, it is also possible to change the invention so that the detuning of the resonator of the sensor object 34 takes place by removing the manipulator 38 from the coil to different extents in the various switching positions, meaning that a detuned resonator is assumed as the basic position.

The following is a list of reference signs used in this specification and in the drawings.

2 Housing
4 First port
6 Second port
8 Passage
10 First closure element
12 Second closure element
14 First valve seat
16 Second valve seat
18 Valve rod
20 Hollow rod
22 Housing duct
24 Adjustment apparatus
26 First piston
28 Second piston
30 Control head
32 Antenna arrangement
34 Sensor object
36 Carrier
38 Manipulator
40 Pin
42 Elongated holes
44 Sensor apparatus
46 Transmitting arrangement
48 Receiving arrangement
50 Transmitting coil
52 First receiving coil
54 Second receiving coil
56 Electronic evaluation unit
58 Distance
60 Outer end of the pin 40
62 Pretensioning spring
64 Carrier
66 Tappet
68 Lid portion
70 Pretensioning spring
M Measurement path
B Movement direction
R1 Resting position of the first closure element
R2 Resting position of the second closure element
L1 Cleaning position of the first closure element
L2 Cleaning position of the second closure element
P0 Position
P1 Position
P2 Position E1 Insertion depth
E2 Insertion depth
H1 Stroke position of the first closure element
H2 Stroke position of the second closure element

The invention claimed is:

1. A double seat valve, comprising:
   a first closure element that can be brought into sealing contact with a first valve seat;
   a second closure element that can be brought into sealing contact with a second valve seat;
   a sensor object coupled to the first closure element, wherein the sensor object comprises an oscillating electric circuit including a coil; and
   a sensor apparatus that interacts with the sensor object, wherein the sensor apparatus comprises a sensor and an electronic evaluation unit, wherein a manipulator has portions with different magnetic properties and is inserted into the coil in a manner that influences a magnetic flux density depending on a position of at least one of the first closure element or the second closure element, and wherein the sensor apparatus is designed for verification of the interaction of the manipulator with the sensor object by a magnetic measurement.

2. The double seat valve according to claim 1, wherein the manipulator overlaps the sensor object in an axial direction depending on a position of at least one of the first closure element or the second closure element, and wherein the sensor apparatus ascertains a degree of overlap.

3. The double seat valve according to claim 1, wherein the manipulator is designed in a shape of a rod.

4. The double seat valve according to claim 1, wherein the sensor object is coupled to a valve rod connected to the first closure element.

5. The double seat valve according to claim 4, wherein the second closure element is connected to a hollow rod, and the valve rod passes through the second closure element and the hollow rod.

6. The double seat valve according to claim 5, wherein:
   the manipulator is connected at an end facing the second closure element to a pin that is connected to the hollow rod, and
   the pin is guided in elongated holes of the valve rod or of a carrier coupled on one side to the valve rod and on another side to the sensor object.

7. The double seat valve according to claim 6, wherein the hollow rod presses the pin and, with the pin, the manipulator in an axial direction of the hollow rod when the second closure element moves.

8. The double seat valve according to claim 1, wherein the manipulator is coupled to the second closure element.

9. A double seat valve, comprising:
   a first closure element that can be brought into sealing contact with a first valve seat;
   a second closure element that can be brought into sealing contact with a second valve seat;
   a sensor object coupled to the first closure element; and
   a sensor apparatus that interacts with the sensor object, wherein the sensor apparatus comprises a sensor and an electronic evaluation unit, a manipulator designed to interact with the sensor object interacts with the second closure element, the sensor apparatus is designed for verification of the interaction of the manipulator with the sensor object, and the manipulator is pretensioned by a pretensioning element into a resting position.

10. The double seat valve according to claim 9, wherein the manipulator is movably mounted to the sensor object.

11. The double seat valve according to claim 10, wherein a hollow rod presses the manipulator in an axial direction of the hollow rod when the second closure element moves.

12. The double seat valve according to claim 11, wherein the hollow rod presses the manipulator in the axial direction of the hollow rod via a tappet.

13. The double seat valve according to claim 9, wherein the sensor object has a lid portion on which the pretensioning element rests.

14. The double seat valve according to claim 9, wherein a distance between the manipulator and the second closure element changes when the second closure element moves, and the distance is filled with a compressible material that is fastened only to the manipulator.

15. The double seat valve according to claim 14, wherein the compressible material is used to move the manipulator back into the resting position.

16. The double seat valve according to claim 9, wherein the pretensioning element is a pretensioning spring.

17. A double seat valve, comprising:
   a first closure element that can be brought into sealing contact with a first valve seat;
   a second closure element that can be brought into sealing contact with a second valve seat;
   a sensor object coupled to the first closure element; and
   a sensor apparatus that interacts with the sensor object, wherein the sensor apparatus comprises a sensor and an electronic evaluation unit, a manipulator designed to interact with the sensor object interacts with the second closure element, the sensor apparatus is designed for verification of the interaction of the manipulator with the sensor object, and the manipulator is movably mounted to the sensor object via a carrier that is movably mounted to the sensor object.

18. The double seat valve according to claim 17, wherein the manipulator has portions with different magnetic properties, and the sensor apparatus verifies the interaction of the manipulator with the sensor object via a magnetic measurement.

19. The double seat valve according to claim 17, wherein the sensor object comprises an oscillating electric circuit, and the manipulator is inserted into a coil of the oscillating electric circuit in a manner that influences a magnetic flux density depending on a position of at least one of the first closure element or the second closure element.

20. The double seat valve according to claim 17, wherein the manipulator is pretensioned by a pretensioning element into a resting position.

* * * * *